(12) United States Patent
Webb

(10) Patent No.: US 6,412,569 B1
(45) Date of Patent: Jul. 2, 2002

(54) CONCRETE MIXING HOE

(76) Inventor: Carlyle Webb, 17531 Santa Paula Cir., Fountain Valley, CA (US) 92708

( * ) Notice: Subject to any disclaimer, the term of this patent is extended or adjusted under 35 U.S.C. 154(b) by 0 days.

(21) Appl. No.: 09/680,822

(22) Filed: Oct. 10, 2000

(51) Int. Cl.$^7$ .............................................. A01B 39/00
(52) U.S. Cl. ............................................ 172/371; 7/16
(58) Field of Search ................................. 172/371, 372, 172/373, 374, 41; D8/10, 11; 30/171; 7/114, 116

(56) References Cited

U.S. PATENT DOCUMENTS

| | | | | |
|---|---|---|---|---|
| 142,149 | A | * | 8/1873 | Crossland |
| 317,502 | A | * | 5/1885 | Canfield |
| 565,379 | A | * | 8/1896 | Dickson |
| 865,150 | A | * | 9/1907 | Andersen |
| 1,167,971 | A | * | 1/1916 | Birn |
| 1,197,530 | A | * | 9/1916 | Morris |
| 1,805,289 | A | * | 5/1931 | Kuno |
| 1,845,222 | A | * | 2/1932 | Birn |
| 2,280,778 | A | * | 4/1942 | Anderson |
| 2,406,280 | A | * | 8/1946 | Beneke |
| 2,752,839 | A | * | 7/1956 | Robertson |
| 3,116,796 | A | * | 1/1964 | Miljan |
| 3,545,551 | A | * | 12/1970 | Niemeyer |
| 3,604,518 | A | * | 9/1971 | Buchanan |
| 3,643,744 | A | * | 2/1972 | Turnquist |
| D246,498 | S | * | 11/1977 | Polc |
| D277,258 | S | * | 1/1985 | Baty |
| 5,628,370 | A | * | 5/1997 | Chrysler |
| 5,947,039 | A | * | 9/1999 | Lundgren et al. |

FOREIGN PATENT DOCUMENTS

| | | | | |
|---|---|---|---|---|
| AU | 180717 | * | 1/1955 | ................ 172/371 |
| CH | 123877 | * | 1/1928 | ................ 172/371 |
| FR | 376949 | * | 3/1907 | ................ 172/371 |
| FR | 2330294 | * | 6/1977 | ................ 172/371 |
| GB | 10411 | * | 7/1890 | ................ 172/371 |
| IT | 424619 | * | 8/1947 | ................ 172/371 |

* cited by examiner

*Primary Examiner*—Victor Batson
(74) *Attorney, Agent, or Firm*—William L. Chapin

(57) ABSTRACT

A hoe for facilitating manual intermixing of materials initially in heterogeneous phases, particularly dry concrete pre-mix and water, includes an elongated straight handle having a rear longitudinal portion adapted to be grasped within a person's hands, and a blade which is attached to and depends perpendicularly downwardly from the front transverse end of a front longitudinal portion of the handle. The blade has substantially parallel front and rear surfaces and has in front and rear elevation views thereof an outline shape approximating that of an inverted isosceles triangle having a generally straight, horizontally disposed upper base, and straight symmetric sides which angle downwardly and inwardly towards a vertical center line of the blade, the lower ends of the sides terminating in the vertex of the triangle. At least one pair of vertically spaced apart, stepped-diameter circular holes is provided through the thickness dimension of the blade, preferably consisting of a first, lower hole located proximate the vertex and centered on the vertical center line of the blade, and a second circular hole of larger diameter located above and vertically aligned with the lower hole. Movement of the blade through a nascent slurry of dry concrete pre-mix components including finely divided Portland cement particles, sand and gravel aggregate and water to intermix the aforementioned ingredients is facilitated by passage of water and less viscous slurry through the lower hole, and passage of gravel aggregate, sand and more viscous slurry through the larger diameter upper hole. Preferably, the blade vertex is truncated by an arcuately curved, convex edge to minimize drag on the blade as the vertex contacts the bottom wall of a mixing tray or wheelbarrow and dragged or pushed along to perform the mixing action.

8 Claims, 1 Drawing Sheet

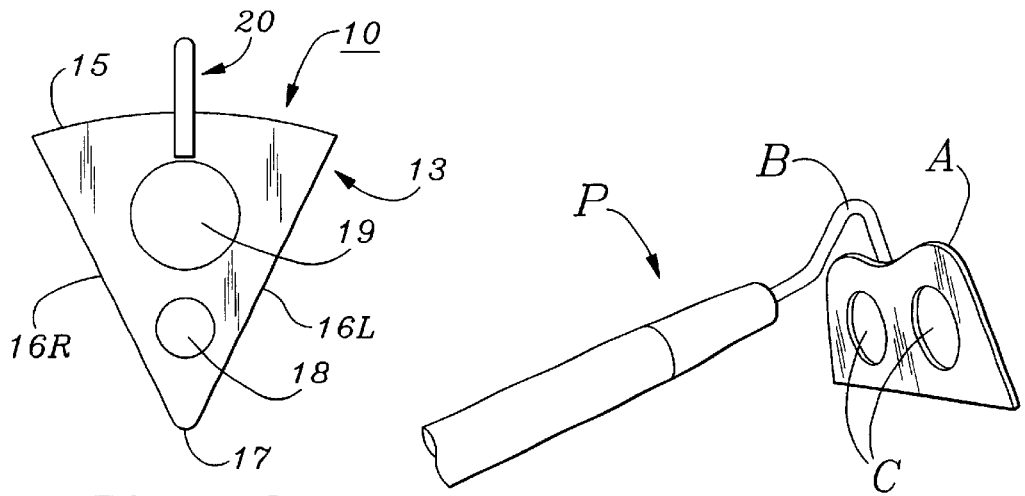
Fig. 1 (PRIOR ART)
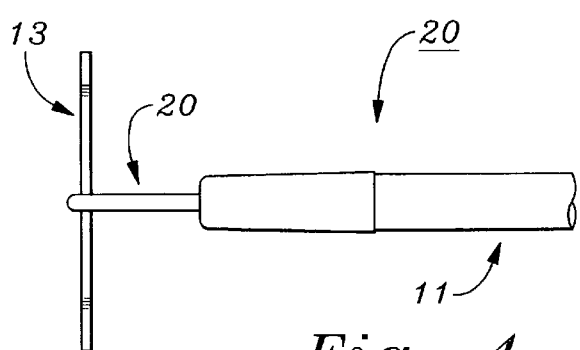
Fig. 3
Fig. 4
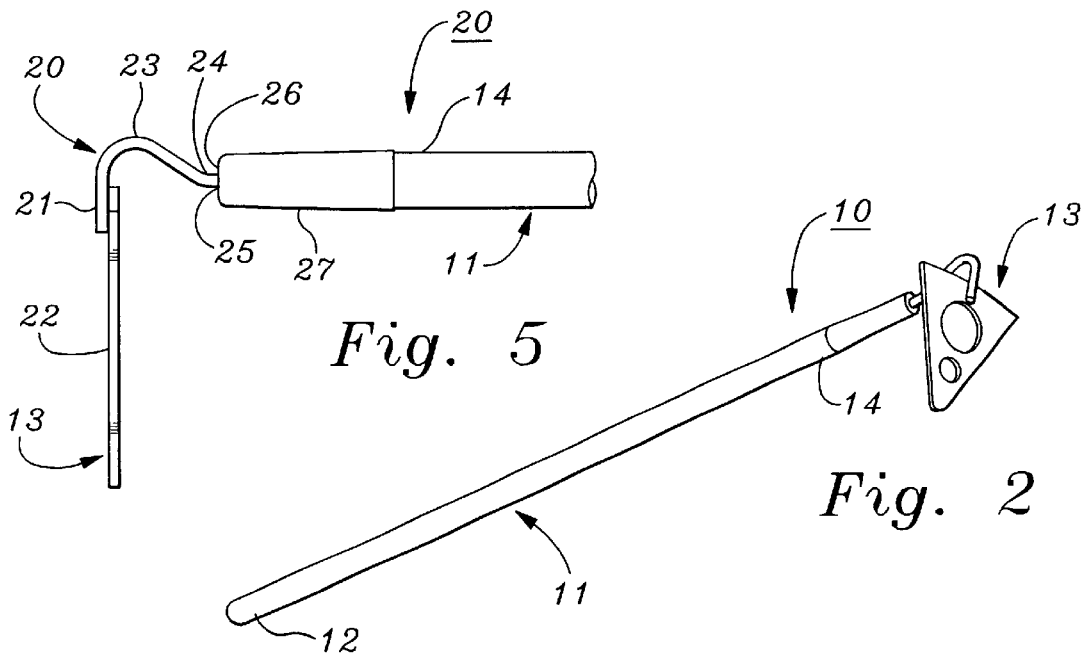
Fig. 5
Fig. 2

CONCRETE MIXING HOE

BACKGROUND OF THE INVENTION

A. Field of the Invention

The present invention relates to tools and implements such as hoes of the type which are typically provided with a long handle for grasping and manipulation by an individual person. More particularly, the invention relates to an improved concrete mixing hoe which facilitates the mixing of dry concrete pre-mix with water to form a viscous slurry suitable for pouring into a construction form or other such structure construction applications.

B. Description of Background Art

Dry concrete "pre-mix" consists of a dry mixture of Portland cement ground to a very fine power, sand, and gravel of a particular size range (aggregate). To prepare the dry concrete pre-mix for use in construction projects, a pre-determined volume of water is added to the dry pre-mix, and thoroughly mixed with the water to form a thick, viscous slurry which may then be poured into formworks at a construction site. The water chemically reacts with the constituents of the Portland cement, typically anhydrous tricalcium silicate, tricalcium aluminate, dicalcium silicate and tetracalcium aluminoferrite, to form a solid gel of needle-like crystals that comprise an interlocking framework which binds the aggregate and sand particles. When these reactions have been driven to completion, in a process referred to as curing, the concrete slurry is transmitted into a substantially strong, stone-like solid consisting of a matrix of Portland cement crystals interspersed with aggregates and sand particles.

The strength, durability and appearance of finished or cured concrete depends strongly on the thoroughness with which the pre-mix ingredients and water are mixed prior to pouring the concrete slurry. Therefore, most concrete is mixed by a machine, either by a motor driven drum at a work site or in central batching and mixing plants, with the fresh concrete being taken to a job site in a revolving drum mounted on a ready-mix truck. However, small batches of concrete are mixed by hand on an increasingly frequent basis, by homeowners, handymen and do-it-yourselfers. For these uses, building supply stores and similar establishments sell dry concrete pre-mix in paper bags, typically containing 60 or 90 pounds of material.

A customary method for utilizing individual bags of dry concrete pre-mix for small jobs includes first pouring a pre-determined quantity of water into a mixing container such as a wheelbarrow or shallow rectangular mixing tray. Next, a bag of dry concrete pre-mix is opened, and the contents of the bag dumped into the mixing container, on top of the water. The water and dry concrete pre-mix, the latter consisting of finely powdered Portland cement, sand, and aggregate, the latter usually consists of gravel of a particular size range, are then mechanically worked to thoroughly mix all four component ingredients. The most commonly used method for mixing small batches of concrete consists of repeatedly inserting the blade of a long handled implement such as a hoe into the material in the mixing container, and drawing the hoe repeatedly through the material to intermingle dry concrete pre-mix ingredients with water in the container.

Existing hoes used for hand mixing concrete have a construction similar to that of common long-handled garden or agricultural hoes. One type of hoe which is widely marketed and used for mixing concrete is substantially similar in construction to the Plasterers Hoe disclosed in Canfield, U.S. Pat. No. 317,502, patented on May 12, 1885. That hoe has a generally rectangularty-shaped, laterally elongated blade, the central portion of which is reinforced by a rib which is a forward extending, thickened portion of a tang and which is attached to the front of the blade. The blade is provided with a pair of identical circular perforations or apertures laterally spaced apart and equidistant from a vertical plane passing centrally through the rib. The upper edge of the blade has a pair of laterally spaced apart, arcuately curved convex protrusions concentric with the two apertures through the blade.

The intended function of Canfield's hoe is to mix dry plaster, a homogeneous material consisting essentially of powdered calcium sulphate (Gypsum), with water to form a viscous paste suitable for application to structure wall lathing of buildings, and similar such uses. However, as described above, concrete pre-mix is a heterogeneous, multi-phase conglomeration of Portland cement powder, sand, and gravel, all of which must be thoroughly intermixed with water to prepare the concrete for pouring. Therefore, while presently used concrete mixing hoes provided with a pair of laterally spaced apart circular holes through the blade seem to permit the hoe blade to be more readily drawn through a vicious multi-phase mixture of water and dry concrete pre-mix, mixing concrete with existing hoes of this type is still a strenuous, tedious task.

Subsequent to Canfield's disclosure, a number of U.S. patents have issued for hoes intended to mix mortar, or perform agricultural tasks. These include:

Dickson, U.S. Pat. No. 565,379, Aug. 4, 1896, Mortar Hoe: Discloses a mortar hoe having an improved blade intended to cut and mix mortar finer, more uniformly and with greater ease then common mortar hoes. The blade has through its thickness pairs of vertically elongated slots located on each side of the vertical center of the blade, and a pair of horizontally elongated slots equidistant from the vertical center and extending over the vertical slots. The upper edge of the blade is arcuately curved to form a pair of convex humps spaced laterally apart and equidistant from the vertical center and, the humps form therebetween a concavely curved groove or trough.

Anderson, U.S. Pat. No. 865,150, Sep. 3, 1907, Mortar Mixer Or Hoe: Discloses a mortar hoe having a generally rectangularly-shaped blade provided in one embodiment with two rows of vertically elongated, generally rectangularly-shaped perforations, and in another embodiment with three rows of generally square-shaped perforations.

Holmes, U.S. Pat. No. 1,127,440, Feb. 9, 1915, Mortar Hoe: Discloses a mortar hoe having a generally rectangularly-shaped blade provided with pairs of vertically elongated perforations located equidistant from the vertical center line of the blade, each of the perforations formed from a vane angled outwardly from the plane of the blade.

Birn, U.S. Pat. No. 1,167,971, Jan. 11, 1916, Mixing Hoe: Discloses a mixing hoe having a generally rectangularly-shaped blade comprising an open frame provided with laterally spaced apart, vertically elongated, rectangularly-shaped apertures each bordered by a vertically elongated mixing bar having a diamond cross section and having longitudinally extending sharp edge portions disposed forwardly and rearwardly with respect to the plane of the blade.

Beymer, U.S. Pat. No. 1,185,581, May 30, 1916, Garden Implement: Discloses a garden implement comprising a hoeing blade having two or more meeting edges sharpened for cutting and an angular shank member having one of its ends connected to the upper end of the blade and its other end projecting rearwardly in a line intersecting the blade at the axis of the working resistance.

Rhomberg, U.S. Pat. No. 1,286,779, Dec. 3, 1918, Hoe: Discloses a garden hoe including a handle and a substantially flat blade having horizontal sets of forwardly and rearwardly extending cutters folded out from rectangular perforations arranged in a horizontal row. The forwardly extending set of triangular cutters have their upper edges horizontal and their lower edges oblique, while the rearwardly extending set of triangular cutters have their upper edges oblique and lower edges horizontal.

Clark, U.S. Pat. No. 1,387,883, Aug. 16, 1921, Hoe: Discloses a hoe including a blade having the shape of a sector of a circle with the apex of the sector pointing downwardly.

Miljan, U.S. Pat. No. 3,116,796, Jan. 7, 1964, Multi-Purpose Agricultural Hand Tool: Discloses a hoe-like agricultural hand tool including a substantially triangularly-shaped blade having a downwardly pointed, curved apex, the blade being angled rearwardly from a plane perpendicular to the axis of the straight handle.

Bojar, PCT/US95/08698, Jul. 13, 1995, Adjustable Pitch Garden Hoe Tool: Discloses an adjustable pitch garden hoe tool.

Solomon, D 35,242, Oct. 29, 1901, Hoe: Discloses an ornamental design for a hoe having a triangular-shaped blade angled forward from a handle.

Pole, D 246,498, Nov. 29, 1977, Blade For A Mortar Hoe: Discloses an ornamental design for a mortar hoe having a flat blade curved rearwardly from a shank fastened to a straight handle, and an extruded mesh surface forming an array of rhomboidly-shaped apertures.

None of the prior art patents known to the present inventor and listed above provide a solution to two problems encountered in hand mixing dry concrete premix with water using prior art implements; specifically, the substantial physical exertion and time required by the use of prior art mixing implements. The present invention was conceived of as a solution to the aforementioned problems.

OBJECTS OF THE INVENTION

An object of the present invention is to provide an improved hoe for mixing dry concrete pre-mix, consisting of Portland cement, sand, and aggregate such as gravel, with water to form a uniformly mixed slurry suitable for pouring into formworks or use in other construction applications.

Another object of the invention is to provide an improved concrete mixing hoe which requires a relatively small force to push or pull the hoe through a viscous multi-phase slurry consisting of concrete premix and water.

Another object of the invention is to provide an improved concrete mixing hoe which requires a relatively short time duration to mix a batch of liquid concrete to a desired degree of uniformity.

Another object of the invention is to provide an improved concrete mixing hoe having an elongated handle provided with a rear hand grip portion and a blade depending generally perpendicularly downwardly from the front end of the handle, the blade having in plan view a shape approximating that of an isosceles triangle with a downwardly pointing vertex.

Another object of the invention is to provide an improved concrete mixing hoe having a blade which in front elevation view has the shape of an isosceles triangle with a downwardly pointing, arcuately convexly shaped vertex.

Another object of the invention is to provide an improved concrete mixing hoe having a blade which has a transversely disposed upper or base edge.

Another object of the invention is to provide an improved concrete mixing hoe having a blade which has in front elevation view a shape approximating that of an inverted isosceles triangle and having through its thickness dimension at least a first hole centered on a vertical center line of the blade and located proximate the vertex.

Another object of the invention is to provide an improved concrete mixing hoe having a blade which has in front elevation view a shape approximating that of an inverted isosceles triangle and having through its thickness dimension a first lower hole centered on a vertical center line of the blade and located proximate the vertex, and a second, upper hole centered on the vertical center line and located above the first hole.

Another object of the invention is to provide an improved concrete mixing hoe having a blade which has in front elevation view a shape approximating that of an inverted isosceles triangle and having through its thickness dimension a plurality of holes arranged vertically along a center line of the blade, each hole being of larger diameter than the one below it.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improved hoe which is particularly well adapted to efficiently, thoroughly and easily mix dry concrete pre-mix with water to form a thick paste or slurry of liquid concrete preparatory to pouring the liquid concrete into a form or using the liquid concrete in other such structural or construction applications.

A preferred embodiment of a concrete mixing hoe according to the present invention includes a conventional elongated, straight handle adapted to be grasped at the rear end thereof by a person's hands. Attached to the front end of the handle is a blade which depends substantially perpendicularly downwards from the longitudinal axis of the handle. According to the present invention, the blade is made of rigid, durable plate stock such as 3/32 inch-thick steel plate, and has a novel shape. Thus, according to the present invention the blade is disposed in a plane perpendicular to the handle, and has in front and rear elevation views a shaped approximating that of an inverted isosceles triangle, with the base of the triangle consisting of generally horizontally disposed upper edge of the blade, and a downwardly depending vertex. The downwardly pointing vertex of the blade is preferably radiused to form a convex, arcuately curved surface. Also, the upper edge of the blade may optionally be arcuately convexly curved rather than straight.

According to the present invention, the blade has through its thickness dimension a plurality of vertically spaced apart holes, centered on a vertical center line of the blade. These holes are preferably of stepped diameters, including a first, lower hole having a first diameter located near the vertex of the blade, and at least a second hole of larger diameter located between the first hole and the upper edge wall of the blade. With this novel construction, the curved vertex and wedge shape of the blade enables the blade to be easily pressed downwardly into dry concrete pre-mix and underlying water loaded into a mixing container such as a wheelbarrow or mixing tray. Moreover, the smaller diameter lower hole through the blade permits the blade to be pulled or pushed through a multi-phase slurry in which the lower component is substantially liquid, i.e., water, the latter passing readily through the smaller hole with little resistance. Additionally, the larger hole provided in the upper portion of the blade permits ready passage of aggregate such as gravel therethrough with little resistance. Therefore, as the blade is pulled or pushed through the heterogenous, multi-phase combination of dry concrete pre-mix and water, the triangular shape of the blade creates a deep, V-shaped channel or furrow in the materials, which is quickly filled in by materials falling into the furrow under the force of gravity, as the blade passes through. This action results in efficient folding or intermixing of material at various heights within the container. Importantly, the stepped diameter holes through the blade of the concrete mixing hoe according to the present invention substantially reduces the force required to pull or push the hoe through a concrete/water slurry, as compared to prior art mixing hoes.

Also, the convex, arcuately curved vertex of the blade according to the present invention functions as a bearing surface, allowing the blade to be inserted into a slurry sufficiently deeply to contact the bottom wall of the container, and still be drawn or pushed longitudinally with less drag force than prior art hoe blades having flat bottom edges. Thus, the novel construction of a concrete mixing hoe according to the present invention enables dry concrete mix to be thoroughly mixed with water to form a slurry ready for use with greater ease and in less time than prior art devices.

BRIEF DESCRIPTION OF THE DRAWINGS

FIG. 1 is a perspective view of a prior art concrete mixing hoe.

FIG. 2 is a perspective view of a concrete mixing hoe according to the present invention.

FIG. 3 is a front elevation view of the article of FIG. 2.

FIG. 4 is an upper plan view of the article of FIG. 2.

FIG. 5 is a side elevation view of the article of FIG. 1.

DESCRIPTION OF THE PREFERRED EMBODIMENTS

FIG. 1 illustrates a prior art plasterer's hoe which is used as a concrete mixing hoe, while FIGS. 2–5 illustrate a novel concrete mixing hoe according to the present invention.

Referring first to FIG. 1, a prior art plasterer's hoe P is shown to include a generally rectangularly-shaped, laterally elongated blade A, the central portion of which has fixed to the front surface thereof a tang B and which is attached to the front of the blade. The blade is provided with a pair of circular perforations or apertures C laterally spaced apart and equidistant from a vertical plane passing centrally through the blade. The upper edge of the blade has a pair of laterally spaced apart, arcuately curved convex protrusions concentric with apertures C.

Referring now to FIGS. 2–5, a concrete mixing hoe 10 according to the present invention may be seen to include an elongated straight handle 11 made of a hard, rigid durable material such as oak, ash, or similar hardwood, or of fiberglass or metal tubing. While the exact dimensions of handle 11 are not critical, it should be of a diameter which permits the rear portion 12 of the handle to be conveniently grasped by an average person's hand, and of a length sufficient to allow the handle to be drawn or pushed the length of an average sized concrete mixing tray or wheelbarrow. Thus, an example embodiment of concrete mixing hoe 10 included a cylindrical handle made of oak and having a length of about 4 feet and a diameter of 1-⅜ inch.

As shown in FIGS. 3–5 in addition to FIG. 2, concrete hoe 10 includes a blade 13 which is attached to the front end 14 of handle 10. Blade 13 is preferably formed from uniform thickness plate stock of a hard, rigid material such as steel. In an example embodiment of concrete mixing hoe 10, blade 13 was made from 3/32 inch thick steel plate having a Rockwell C hardness of 30.

As may be seen best by referring to FIG. 3, blade 13 of concrete mixing hoe 10 has in front and rear elevation views of the blade a shape approximating that of an inverted isosceles triangle. Thus, as shown in FIG. 3, blade 13 has an upper edge wall 15 comprising the base of an isosceles triangle. As shown in FIG. 3, upper or base edge 15 of blade 13 may optionally be arcuately convexly curved.

Referring still to FIG. 3, it may be seen that blade 13 has a pair of straight, left and right sides 16L and 16R, respectively, which angle symmetrically downwardly and inwardly from upper edge wall 15 towards a vertical center line of the blade. Left and right sides 16L and 16R of blade 17 intersect to define a downwardly pointing vertex 17 of an isosceles triangle. As shown in FIG. 3, vertex 17 is preferably radiused to form an accurately curved, downwardly convex surface. Although the precise dimensions of blade 13 are not critical, an example embodiment of concrete mixing hoe 10 which performed quite satisfactorily had a base width of 6 inches, and a height of 7 inches.

Referring still to FIG. 3, it may be seen that blade 13 has through its thickness dimension a pair of vertically spaced apart, circular lower and upper holes 18 and 19 respectively, centered on a vertical center line of the blade. As shown in FIG. 3, lower hole 18 through blade 13 is located in the lower half of the blade, near tip 17 of the blade. Upper hole 19 through blade 13 is located near upper edge or base 15 of the blade. As will be explained in greater detail below, lower, smaller diameter hole 18 is provided to permit water and relatively fluid cement slurry located in the lower part of a mixing container to pass through blade 13 as it is pulled or pushed through concrete pre-mix and water components contained in the mixing container, while the imperforate parts of blade 13 displace and mix the slurry components. Larger diameter, upper hole 19 is provided to facilitate passage of drier cement powder, aggregates and more viscous slurry located in the upper part of the container to pass through blade 13 as it is pulled or pushed through pre-mix and water in the mixing container. While the precise dimensions and locations of lower and upper holes 18 and 19 are not critical, an example embodiment of concrete mixing hoe 10 which performed quite satisfactorily had a blade 13 provided with a lower hole 18 having a diameter of 1-¼ inches and a center located 2-⅜ inches upward from the lower point of vertex 17, and an upper hole 19 having a diameter of 2-¼ inches and a center located 4-¾ inches from the lowest point of vertex 17.

Referring now to FIGS. 4 and 5 in addition to FIG. 3, it may be seen that concrete mixing hoe 10 includes means which firmly attach blade 13 to handle 11. Thus, shown in FIGS. 3–5, blade 13 of hoe 10 is attached to handle 11 by a shank 20 bent from a length of bar stock. In an example embodiment of hoe 10, shank 20 was formed from a length of square ⅜" by ⅜" steel bar stock having a Rockwell hardness of 30C.

As may be seen best by referring to FIG. 5, shank 20 has a generally vertically downwardly disposed front longitudinal portion 21 which is affixed to front surface 22 of blade 13 by any suitable means, such as a welded joint. Alternatively, shank 20 and blade 13 could be fabricated as a unitary structure. As shown in FIGS. 3–5, front portion 21 of shank 20 is laterally centered on blade 13, with the front transverse end wall of front portion 21 being located above the upper edge of upper hole 19 through the blade, and protrudes upwardly beyond upper edge 15 of the blade. Shank 20 also has a sinuously curved intermediate longitudinal portion 23 which curves upwardly, thence downwardly and rearwardly from front shank portion 21. Also, shank 20 has a rear straight, generally horizontally disposed shank portion 24 which is received in a bore 25 which extends coaxially inwardly from front transverse end face 26 of handle 11. Shank 20 is secured within handle bore 25 by any suitable means, such as by a ferrule 27 which fits tightly over front end portion 14 of handle 11.

Concrete mixing hoe 10 is used as follows. A quantity of water, typically equal in weight to about one-quarter of the weight of concrete pre-mix in a bag, is first poured into a shallow mixing container, such as a wheelbarrow or tray. A bag of concrete pre-mix, containing a mechanical mixture of finely divided Portland cement, sand and aggregates such as sized gravel, is then emptied into the mixing container on top of the water. Typical bags of concrete pre-mix contain about 50 pounds of pre-mix material. Mixing of the water and concrete pre-mix is initiated by positioning blade 13 at the far end of the mixing container and applying downward force on the handle to force vertex 17 of blade 13 into the dry concrete pre-mix material in the upper portion of the container. The wedge shape of blade 13 enables vertex 17 to easily penetrate deeply into the dry pre-mix ingredients. Handle 11 of hoe 10 is then drawn towards the near end of the container by the workman. During this step, angled sides 16R and 16L of blade 13 create a V-shaped channel or trench in the mixture residing in the mixing container. Drag forces which oppose this pulling action are minimized by lower hole 18 enabling ready passage of water and lower viscosity slurry components through blade 13, and by upper hole 19 enabling ready passage of aggregates and more viscous slurry components through the blade.

As blade 13 passes through the. concrete pre-mix and water mixture in the mixing container, the furrow created in the mixture is filled by upper material tumbling downwardly into the furrow, thus facilitating vertical mixing of the various component phases within the container. Angled flat sides 16R, 16L of blade 13 also help to divert material inwardly from the sides of the container towards the trajectory of the blade as it is moved relative to the container. This action facilitates lateral mixing action, and reveals any dry spots or insufficiently mixed regions within the container.

Pulling strokes to effect mixing of concrete pre-mix and water, as described above, are repeated until a desired consistency of the concrete slurry has been achieved. The novel design of concrete hoe also enables the hoe to function efficiently when pushed as well as pulled, affording. the workman the option of executing both pushing, and pulling mixing strokes. As mixing progresses, deeper strokes are generally employed, in which vertex 17 of blade 13 may contact the upper surface of the bottom wall of the mixing container. Since vertex 17 is arcuately curved, blade 13 may be dragged along in contact with the container bottom wall surface with minimal drag resistance, as compared to prior art concrete mixing hoes.

The novel design and construction of concrete mixing hoe 10 described above substantially increases the speed and ease of mixing concrete pre-mix with water.

what is claimed is:

1. A concrete mixing hoe adapted to mixing dry concrete pre-mix material with water to form a liquid concrete slurry suitable for pouring into forms, said dry concrete pre-mix material including as components finely divided particles of Portland cement powder, sand grains having larger diameters than diameters of said Portland cement powder particles, and aggregate pieces having larger diameters than diameters of said sand grains, said hoe comprising;

a. an elongated straight handle having a rear longitudinal portion adapted to being grasped within a person's hands, and a front longitudinal portion, and b. a blade attached to said front longitudinal portion of said handle, said blade being a generally plate-like member which depends downwardly from said handle and having front and rear wall surfaces disposed generally perpendicularly to a central longitudinal axis of said handle, said blade having in front and rear elevation views an outline shape approximating that of an inverted isosceles triangle, with a generally horizontally disposed base and a downwardly depending vertex, said blade having through its thickness dimension, I. a first laterally symmetrically-shaped hole having a center located on a vertical center line of said blade, and II. a second laterally symmetrically-shaped hole larger than said first and having a center vertically aligned with said center of said first hole and located further from said vertex of said blade than said center of said first hole, said first and second holes cooperating to facilitate movement of said blade through a mixture of said dry concrete pre-mix components and water, when said blade is drawn therethrough to effect intermixing said pre-mix components with said water.

2. The concrete mixing hoe of claim 1 wherein said first hole is further defined as being circular.

3. The concrete mixing hoe of claim 2 wherein said second hole is further defined as being circular.

4. The concrete mixing hoe of claim 3 wherein said second hole is further defined as having a larger diameter than that of said first hole.

5. A concrete mixing hoe for mixing dry concrete pre-mix material with water to form a liquid concrete slurry suitable for pouring into forms, said dry concrete pre-mix material including as components particles of finely divided Portland cement powder, sand grains having larger diameters than diameters of said Portland cement powder particles, and aggregate pieces having larger diameters than diameters of said sand grains, said hoe comprising;

a. an elongated straight handle having a rear longitudinal portion adapted to being grasped within a person's hands, and a front longitudinal portion, and b. a blade disposed generally perpendicularly downwardly from said front longitudinal portion of said handle, said blade being a plate-like member having generally parallel front and rear wall surfaces, said blade having in front and rear elevation views an outline shape approximating that of an inverted isosceles triangle, with a generally horizontally disposed base and a downwardly depending vertex, said blade having through its thickness dimension at least a first, lower circularly-shaped hole proximate said vertex, said first, lower hole being centered on a vertical center line of said blade, and a second, upper hole larger than said first, lower hole, centered on said vertical center line of said blade and located above said first hole, and c. means for fastening said blade to said handle.

6. The concrete mixing hoe of claim 5 wherein said second, upper hole is further defined as having a circular shape larger than that of said first, lower hole.

7. The concrete mixing hoe of claim 5 wherein said vertex of said blade is further defined as being arcuately shaped.

8. The concrete mixing hoe of claim 5 wherein said means for fastening said blade to said handle is further described as including an elongated, curved shank of generally uniform cross section having a front longitudinal portion laterally centered on and attached to said blade, an intermediate longitudinal portion which curves sinuously upwardly of and thence downwardly and rearwardly of said blade, and a rear longitudinal portion which is received and retained coaxially within a bore within said front portion of said handle.

* * * * *